US006591313B1

(12) United States Patent
Hata et al.

(10) Patent No.: US 6,591,313 B1
(45) Date of Patent: Jul. 8, 2003

(54) ELECTRONIC EQUIPMENT, METHOD OF RECEIVING DATA, METHOD OF TRANSMITTING DATA, METHOD OF SETTING CHANNEL AND METHOD OF GROUPING ELECTRONIC EQUIPMENT INTO CHANNELS

(75) Inventors: Hajime Hata, Tokyo (JP); Junji Kato, Tokyo (JP); Makoto Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 446 days.

(21) Appl. No.: 09/583,810

(22) Filed: May 30, 2000

(30) Foreign Application Priority Data

May 27, 1999 (JP) ............................................. 11-148598

(51) Int. Cl.$^7$ ............................................. G06F 13/14
(52) U.S. Cl. ....................................................... 710/33
(58) Field of Search ................................. 710/8–19, 33

(56) References Cited

U.S. PATENT DOCUMENTS

| | | | |
|---|---|---|---|
| 4,707,828 A | | 11/1987 | Yamada |
| 5,535,208 A | * | 7/1996 | Kawakami et al. .......... 370/391 |
| 5,825,752 A | * | 10/1998 | Fujimori et al. ............. 370/260 |
| 5,828,656 A | * | 10/1998 | Sato et al. .................... 370/254 |
| 5,883,621 A | | 3/1999 | Iwamura |
| 6,078,783 A | * | 6/2000 | Kawamura et al. .......... 725/120 |
| 6,101,215 A | * | 8/2000 | Takeda et al. ................ 375/221 |
| 6,128,316 A | * | 10/2000 | Takeda et al. ................ 370/468 |
| 6,226,697 B1 | | 5/2001 | Tokuhiro |
| 6,282,597 B1 | * | 8/2001 | Kawamura .................... 710/105 |
| 6,341,127 B1 | * | 1/2002 | Katsube et al. ............... 370/352 |
| 6,389,496 B1 | * | 5/2002 | Matsuda ........................ 710/316 |
| 6,389,547 B1 | * | 5/2002 | James et al. .................. 713/400 |

FOREIGN PATENT DOCUMENTS

| | | |
|---|---|---|
| EP | 0739110 | 10/1996 |
| JP | 10013446 | 1/1998 |

* cited by examiner

Primary Examiner—Sumati Lefkowitz
(74) Attorney, Agent, or Firm—Jay H. Maioli

(57) ABSTRACT

It becomes possible for a user to set a transmission or reception channel arbitrarily and easily, by having each piece of equipment connected to an IEEE 1394 bus include a register provided within a RAM 113 to thereby set a transmission or reception default channel. If channels used in the transmission and the reception are not set when the transmission is started, then the default channel may be used. When equipment is set to a channel setting mode by operating an operation section 116, a control section 112 may display a channel setting picture on a display section 115. In this state, a user may select a set channel by operating an up-key 116*a* and a down-key 116*b* of the operation section 116. Thereafter, when a user operates a "YES" key 116*c*, the control section 112 may write a selected channel in the above-mentioned register, and ends a default channel setting operation. A user can set the transmission or reception channel arbitrarily and easily.

18 Claims, 16 Drawing Sheets

FIG. 8

| OFFSETS | NAMES | OPERATIONS |
|---|---|---|
| 000h | STATE_CLEAR | STATE AND CONTROL INFORMATION |
| 004h | STATE_SET | SET STATE_CLEAR BIT |
| 008h | NODE_IDs | INDICATE 16-BIT NODE ID |
| 00Ch | RESET_START | START COMMAND RESET |
| 018h–01Ch | SPLIT_TIMEOUT | PRESCRIBE MAXIMUM TIME OF SPLIT |
| 200h | CYCLE_TIME | CYCLE TIME |
| 210h | BUSY_TIMEOUT | PRESCRIBE LIMIT OF RETRY |
| 21Ch | BUS_MANAGER | INDICATE BUS MANAGER ID |
| 220h | BANDWIDTH_AVAILABLE | INDICATE BAND THAT CAN BE ALLOCATED TO ISOCHRONOUS COMMUNICATION |
| 224h–228h | CHANNELS_AVAILABLE | INDICATE STATE IN WHICH EACH CHANNEL IS IN USE |

F I G. 9
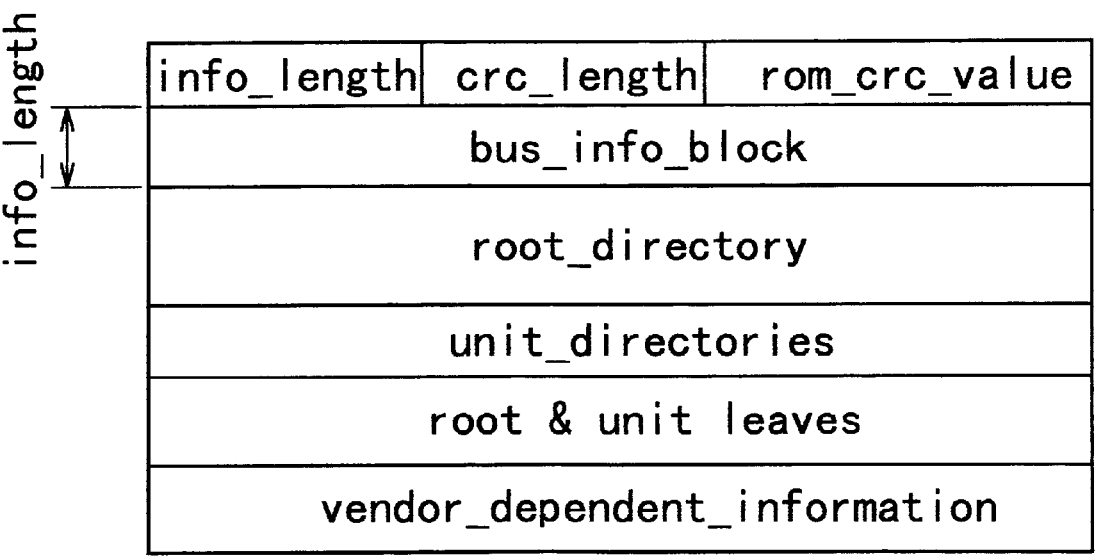

FIG. 10

| | | | |
|---|---|---|---|
| 400h | 04h | crc_length | rom_crc_value |

Bus_info_block

| | |
|---|---|
| 404h | "1394" |
| 408h | irmc/cmc/isc/bmc / reserved / cyc_clk_acc / max_rec / reserved |
| 40Ch | Company_ID / Chip_ID_hi |
| 410h | Chip_ID_lo |

Root_directory

| | | |
|---|---|---|
| 414h | root_length | CRC |
| 418h | 03h | module_vendor_id |
| 41Ch | 0Ch | node_capabilities |
| 420h | 8Dh | node_unique_id offset |
| 424h | D1h | unit_directory_offset |
| 428h | | Optional. |

Unit_directory

| | |
|---|---|
| unit_directory_length | CRC |
| 12h | unit_spec_id |
| 13h | unit_sw_version |
| | Optional. |

FIG. 11

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 12

(A) oMPR

| data rate capability | broadcast channel base | nonpersistent extension field | persistent extension field | reserved | number of output plugs |
|---|---|---|---|---|---|
| 2 | 6 | 8 | 8 | 3 | 5 (bit) |

(B) oPCR[n]

| on-line | broadcast connection counter | point-to-point connection counter | reserved | channel number | data rate | overhead ID | payload |
|---|---|---|---|---|---|---|---|
| 1 | 6 | 6 | 2 | 6 | 2 | 4 | 10 (bit) |

(C) iMPR

| data rate capability | reserved | nonpersistent extension field | persistent extension field | reserved | number of output plugs |
|---|---|---|---|---|---|
| 2 | 6 | 8 | 8 | 3 | 5 (bit) |

(D) iPCR[n]

| on-line | broadcast connection counter | point-to-point connection counter | reserved | channel number | reserved |
|---|---|---|---|---|---|
| 1 | 1 | 6 | 2 | 6 | 16 (bit) |

| CTS | CT/RC | HA | OPC | OPR1 | OPR2 | ------ |

FIG. 17A SET COMMAND

| CTS | CT/RC | HA | OPC | OPR1 | OPR2 |
|---|---|---|---|---|---|
| 0h | CONTROL | EQUIPMENT B | DEFAULT CHANNEL SET | INPUT OR OUTPUT | CHANNEL NUMBER |

FIG. 17B RESPONSE

| CTS | CT/RC | HA | OPC | OPR1 | OPR2 |
|---|---|---|---|---|---|
| 0h | ACCEPTED | EQUIPMENT A | DEFAULT CHANNEL SET | INPUT OR OUTPUT | CHANNEL NUMBER |

ELECTRONIC EQUIPMENT, METHOD OF RECEIVING DATA, METHOD OF TRANSMITTING DATA, METHOD OF SETTING CHANNEL AND METHOD OF GROUPING ELECTRONIC EQUIPMENT INTO CHANNELS

BACKGROUND OF THE INVENTION

1. Field of the Invention

This invention relates to electronic equipment for use with a communication system connected by a communication bus such as an IEEE 1394 bus, for example. More particularly, this invention relates to electronic equipment or the like including a register for setting transmission and reception channels and an operation means for setting channels to this register and in which the transmission and reception channels can be set arbitrarily and easily.

2. Description of the Related Art

In a communication system connected by a communication bus such as an IEEE 1394 bus, a channel and a band which are bus resources may be maintained and a connection may be made by a virtual plug according to the IEC 61883-1 standard, whereby a video signal, an audio signal and the like can be transferred in the isochronous mode.

However, since conventional electronic equipment comprising the above-mentioned communication system are difficult to actively discover equipment to be connected, any of electronic equipment may use the same channel in advance. Even when there are bands to spare, electronic equipment should take the channel from other electronic equipment or should wait for the available channel until the channel is opened.

The IEC 61883-1 standard has a function (1) capable of setting a channel available in transmission equipment and reception equipment when the transmission is started, and is unable to set a channel without searching equipment to be connected. Also, when the transmission is started, if the channel is not set, then transmission equipment is able to transmit data via a previously-determined channel (default channel) described in a specific transmission setting register. Although this IEC 61883-1 standard has prepared a function (2) capable of designating another channel by rewriting this default channel, this standard is unable to set a channel of reception equipment.

Accordingly, when the above-mentioned function (1) is not in use, if some method of operating a channel is not determined, then it is not possible to execute a transmission using a plurality of channels. This situation may apply for other cases in which a signal to be transmitted is a signal of the same type and a signal of other format as well. Further, when a plurality of channels are not in use, even though different transmission rates are permitted in a bus, data should be transmitted at the lowest transmission rate in order for electronic equipment to match with performances of all sorts of reception equipment.

SUMMARY OF THE INVENTION

Therefore, it is an object of this invention to provide electronic equipment or the like in which a transmission channel and a reception channel can be set arbitrarily and easily.

Electronic equipment according to this invention is electronic equipment connected to a communication bus for receiving data of a predetermined channel transmitted through the communication bus. This electronic equipment comprises a memory means for setting a reception channel and an operation means for setting the reception channel to this memory means. In this case, this electronic equipment may further include a display means for displaying a setting picture to set the reception channel to this memory means.

Also, electronic equipment according to this invention is electronic equipment connected to a communication bus for receiving data of a predetermined channel transmitted through the communication bus. This electronic equipment comprises a memory means for setting a reception channel, a reception means for receiving a communication command transmitted through the communication bus and a setting means for setting the reception channel to the memory means if the communication command received at this reception means is a communication command concerning the setting of the reception channel.

Also, electronic equipment according to this invention is electronic equipment connected to a communication bus for transmitting data of a predetermined channel to the communication bus. The electronic device comprises a memory means for setting a transmission channel and an operation means for setting a transmission channel to this memory means. In this case, this electronic equipment may further include a display means for displaying a setting picture to set the transmission channel to the memory means.

Also, electronic equipment according to this invention is electronic equipment connected to a communication bus for transmitting data of a predetermined channel to the communication bus. This electronic equipment comprises a memory means for setting a transmission channel, a reception means for receiving a communication command transmitted through the communication bus and a setting means for setting the transmission channel to the memory means if the communication command received at this reception means is a communication command concerning the setting of the transmission channel.

Also, a data reception method according to this invention is a data reception method connected to a communication bus for receiving data of a predetermined channel transmitted through the communication bus. This data reception method comprises the steps of a reception channel setting operation process for executing an operation to set a reception channel, a reception channel setting process for memorizing the reception channel in memory means based on the operation and a reception process for receiving the data of the reception channel transmitted through the communication bus based on the reception channel set to the memory means.

Also, a data reception method according to this invention is a data reception method connected to a communication bus for receiving data of a predetermined channel transmitted through the communication bus. This data reception method comprises the steps of a reception process for receiving a communication command transmitted through the communication bus, a determination process for determining whether or not the communication command received at the reception process is a communication command concerning the setting of a reception channel, a setting process for setting a reception channel to a memory means if the communication command is the communication command concerning the setting of the reception channel and a reception process for receiving the data of the reception channel transmitted through the communication bus based on the reception channel set to the memory means.

Also, a data transmission method according to this invention is a data transmission method connected to a communication bus for transmitting data of a predetermined channel to the communication bus. This data transmission method comprises the steps of a transmission channel setting operation process for executing an operation to set a transmission channel, a transmission channel setting process for memorizing the transmission channel in a memory means based on the above-mentioned operation and a transmission process for transmitting data through the communication bus from the transmission channel based on the transmission channel set to the memory means.

Also, a data transmission method according to this invention is a data transmission method connected to a communication bus for transmitting data of a predetermined channel to the communication bus. This data transmission method comprises the steps of a reception process for receiving a communication command transmitted through the communication bus, a determination process for determining whether or not the communication command received at the reception process is a communication command concerning the setting of a transmission channel, a setting process for setting a transmission channel to the memory means if the communication command is the communication command concerning the setting of the transmission channel and a transmission process for transmitting data from the transmission channel through the communication bus based on the transmission channel set to the memory means.

According to this invention, electronic equipment may include a memory means for setting a reception channel and a transmission channel. The reception channel and the transmission channel may be set to this memory means by an operation means. Alternatively, the reception channel and the transmission channel may be set to this memory means in accordance with a received communication command.

Also, electronic equipment according to this invention may be electronic device connected to a communication bus. This electronic equipment may comprise an issue means for issuing a communication command to set either of or both of a reception channel and a transmission channel of other electronic equipment connected to a communication bus and a transmission means for transmitting a communication command issued by this issue means through a communication bus to other electronic equipment.

Also, a channel setting method according to this invention is a channel setting method of setting a channel of electronic equipment connected to other electronic equipment through a communication bus. This channel setting method comprises the steps of an issue process for issuing a communication command used to set either of or both of a reception channel and a transmission channel of other electronic equipment connected to the communication bus and a transmission process for transmitting the communication command issued at the issue process to the other electronic equipment through the communication bus.

According to this invention, when either of or both of the reception channel and the transmission channel of other electronic equipment connected to the communication bus may be set, a communication command therefor may be issued. This communication command may be transmitted through the communication bus to other electronic equipment. Thus, in other electronic equipment, the reception channel and the transmission channel may be set to the memory means for setting the reception channel and the transmission channel, for example.

Also, electronic equipment according to this invention may be electronic equipment connected to a communication bus. This electronic equipment may comprise an information acquisition means for acquiring information of all electronic equipment connected to the communication bus, a group means for grouping all electronic equipment into a plurality of channels based on the information acquired by the information acquisition means and a display control means for displaying the grouped states from this group means on a display. In this case, this electronic equipment may further include an operation means for performing a confirmation operation of the grouped states from this group means and a channel setting means for setting a transmission or reception channel used by all electronic equipment based on the grouped states when the confirmation operation is performed by this operation means.

A channel grouping method according to this invention is a channel grouping method of grouping electronic equipment connected to other electronic equipment through a communication bus into a plurality of channels. This channel grouping method comprises the steps of an information acquisition process for acquiring information of a plurality of electronic equipment connected to the communication bus, a grouping process for grouping a plurality of electronic equipment into a plurality of channels based on information acquired at the information acquisition process and a display process for displaying the grouped states of the grouping process on a display.

According to this invention, information (e.g. model information and icon information) of all electronic equipment connected to the communication bus may be acquired, and all electronic equipment may be grouped in association with a transmission rate and a corresponding speed. Then, this grouped state may be displayed on the display, whereby a user can refer to such grouped state when all electronic equipment may be grouped. Also, when a user executes the confirmation operation for such grouping, channels of all electronic equipment may be set automatically based on such grouped state, and a user may become possible to omit a channel setting operation.

BRIEF DESCRIPTION OF THE DRAWINGS

FIG. 8 is a diagram to which reference will be made in explaining positions, names and operations of principal CSRs;

FIG. 9 is a diagram to which reference will be made in explaining a general ROM format;

FIG. 10 is a diagram showing details of a bus information block, a root directory and a unit directory;

FIG. 11 is a diagram to which reference will be made in explaining an arrangement of a PCR;

FIGS. 12A to 12D are diagrams showing arrangements of an oMPR, an oPCR, an iMPR and an iPCR, respectively;

FIGS. 17A and 17B are diagrams showing formats of a default channel set command and a response.

DESCRIPTION OF THE PREFERRED EMBODIMENT

An embodiment according to this invention will hereinafter be described with reference to the drawings.

Figure 1:
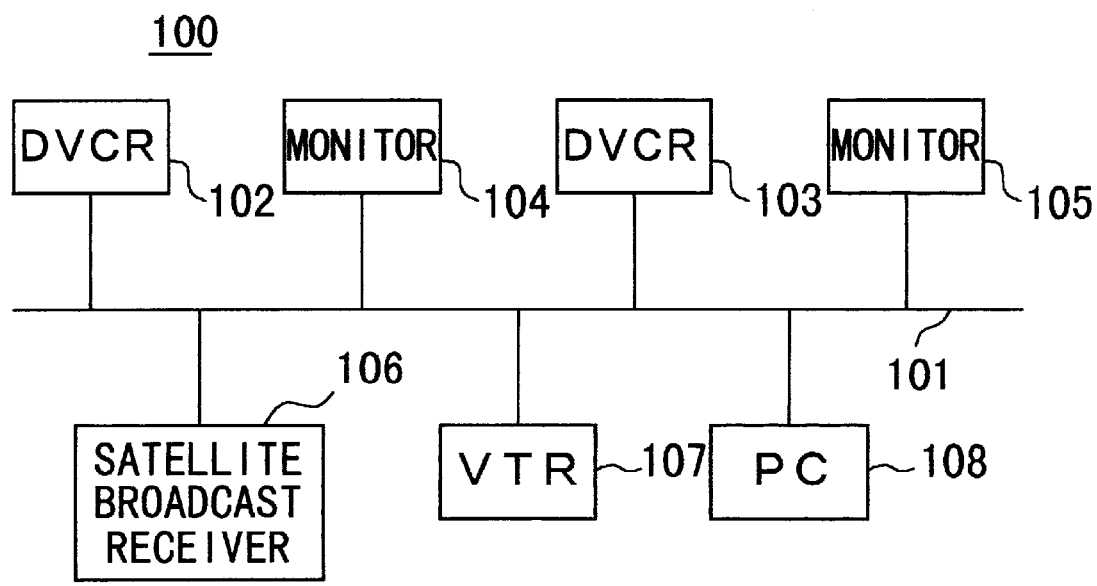
FIG. 1 is a block diagram showing an arrangement of a communication system using an IEEE 1394 bus according to an embodiment of the present invention.

FIG. 1 of the accompanying drawings shows in block form a communication system 100 in which a plurality of electronic equipment serving as IEEE 1394 nodes may be connected to an IEEE 1394 bus. This communication system 100 may be arranged by connecting DVCRs (digital video cassette recorders) 102, 103, monitors 104, 105, a satellite broadcast receiver 106, a VTR (video tape recorder) 107 and a PC (personal computer) 108 to an IEEE 1394 bus 101.

Figure 2:
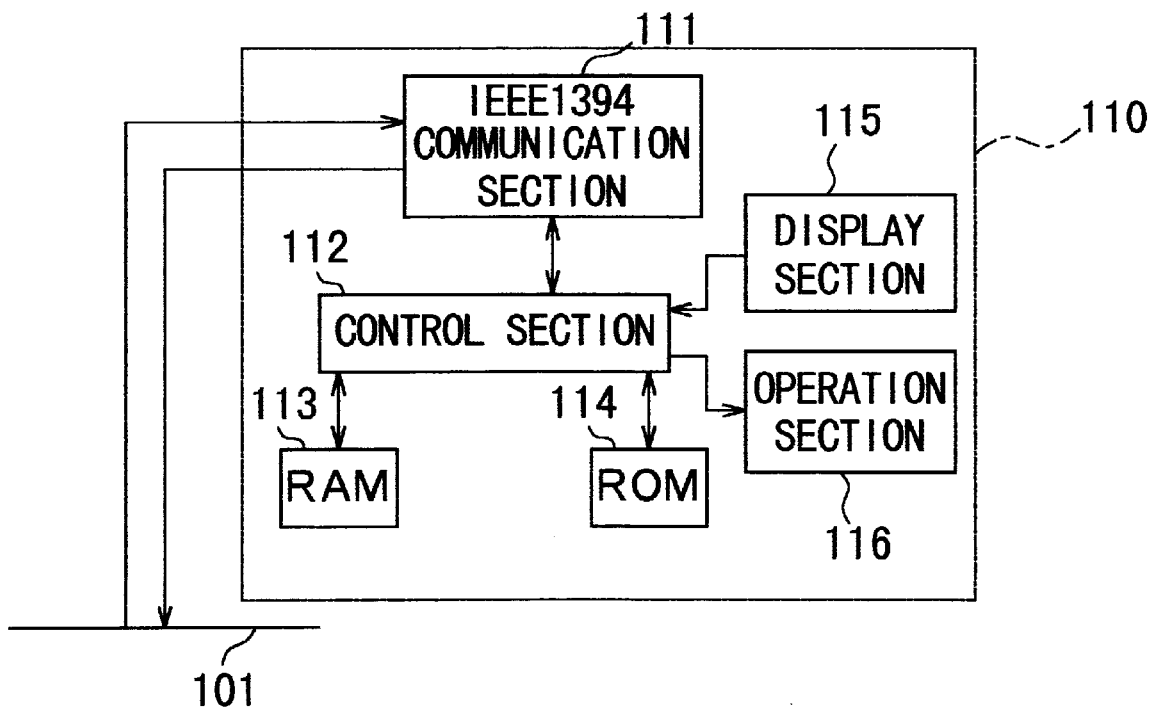
FIG. 2 is a block diagram showing an arrangement of a main portion of an IEEE 1394 node.

In general, the IEEE 1394 node 110 may comprise an IEEE 1394 communication section 111, a control section 112, a RAM (random-access memory) 113, a ROM (read-only memory) 114, a display section 115 and an operation section 116 as shown in FIG. 2. Under control of the control section 112, the IEEE 1394 communication section 111 may assemble data supplied from the control section 112 into packets, may transmit this IEEE 1394 packet through the bus 101, may extract data from the packet received from the bus 101, and may output the extracted data to the control section 112.

The ROM 114 may include a configuration ROM, and this ROM 114 may store therein various kinds of programs, various kinds of parameters or the like. The RAM 113 may function as an IEEE 1394 CSR (control and status registers), and may properly store therein data, programs and the like required when the control section 112 may execute a variety of processing.

Figure 3:
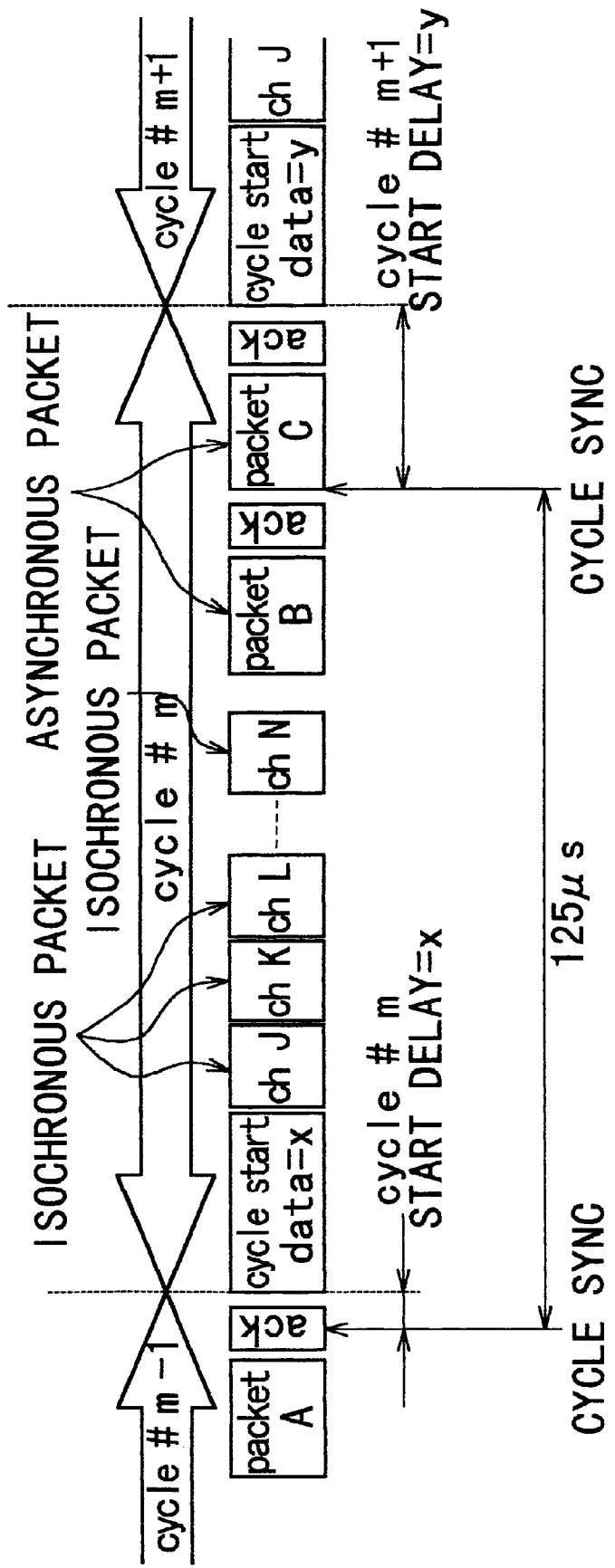
FIG. 3 is a diagram showing a cycle structure of a data transmission of equipment connected via the IEEE 1394.

FIG. 3 is a diagram showing a data transmission cycle structure of equipment connected via the IEEE 1394. According to the IEEE 1394, data may be divided into packets and may be transmitted in a timesharing manner based on a communication cycle of a duration of 125 $\mu$s. This cycle may be created by a cycle start signal supplied from a node (any one of the equipment shown in FIG. 1) having a cycle master function.

As the data transfer mode within one communication cycle, there may be available an isochronous data transfer mode for transmitting an information signal such as a video signal and an audio signal and an asynchronous data transfer mode for irregularly transferring control signals such as an operation control command for equipment and a connection control command among equipment, if necessary. According to the IEEE 1394 standard, data may be transferred at the unit of packets.

The isochronous packet may maintain a band (referred to as a band although it is assumed to be a time unit) necessary for transmission from the beginning of all cycles. Therefore, in the isochronous transmission, the transmission of data within a constant time may be guaranteed. However, when a transmission error occurs, the isochronous transmission may not have a structure to protect data from such transmission error so that data may be lost. During a time period which may not be used in the isochronous transmission of each cycle, a node, which has maintained the bus as a result of arbitration, may transmit an asynchronous packet. Although the asynchronous transmission may guarantee a reliable transmission by using an acknowledge and a retry, a transmission timing may not become constant.

In order for a predetermined node to execute the isochronous transmission, such node should cope with the isochronous function. Also, at least one of nodes which may cope with the isochronous function should have the cycle master function. Further, at least one of nodes connected to the IEEE 1394 bus 101 should have an isochronous resource manager function.

In the asynchronous data transfer, a control signal in which some equipment issues some request to other equipment will be referred to as a command, and the side for transmitting this command will be referred to as a controller. Then, the side for receiving the command will be referred to as a target. The target may return a control signal (response) indicative of the executed result of the command to the controller, if necessary. Then, a series of exchanges which may be started by the transmission of the command and which may be ended by the return of the response will be referred to as a command transaction.

The controller may be able to request a specific operation to the target and to inquire the present state of the target by using the command transaction. Also, equipment within the system may be able to start and end the command transaction. That is, the equipment within the system may become either the controller or the target.

Figure 4:
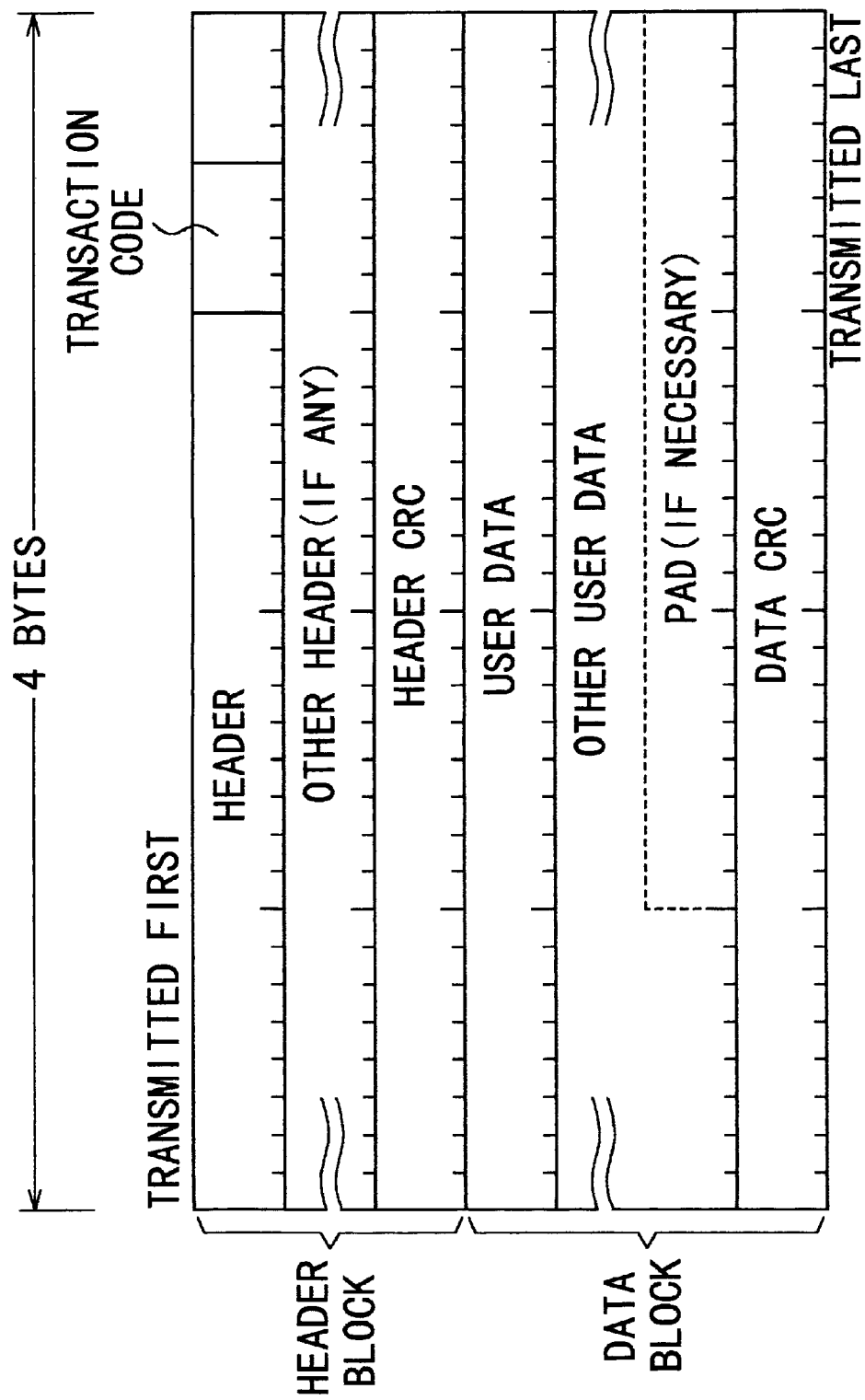
FIG. 4 is a diagram showing a fundamental format of an IEEE 1394 standard packet.

As described above, according to the IEEE 1394 standard, data may be transferred at the unit of packets. FIG. 4 shows a data format which may be used to implement the data communication according to the IEEE 1394 standard, i.e. a fundamental format of packet. That is, roughly classified, this packet may comprise a header, a transaction code (tcode), a header CRC, user data and a data CRC. The header CRC may be generated based on only the header. The IEEE 1394 standard may prescribe that the node should not effect an action on a header which may be rejected by the check of the header CRC or should not answer such rejected header. Also, according to the IEEE 1394 standard, the header should contain the transaction code, and this transaction code may define types of principal packets.

Also, according to the IEEE 1394 standard, as derivatives of the packet shown in FIG. 4, there may be available an isochronous packet and an asynchronous packet (see FIG. 3) which may be discriminated by the transaction code.

Figure 5:
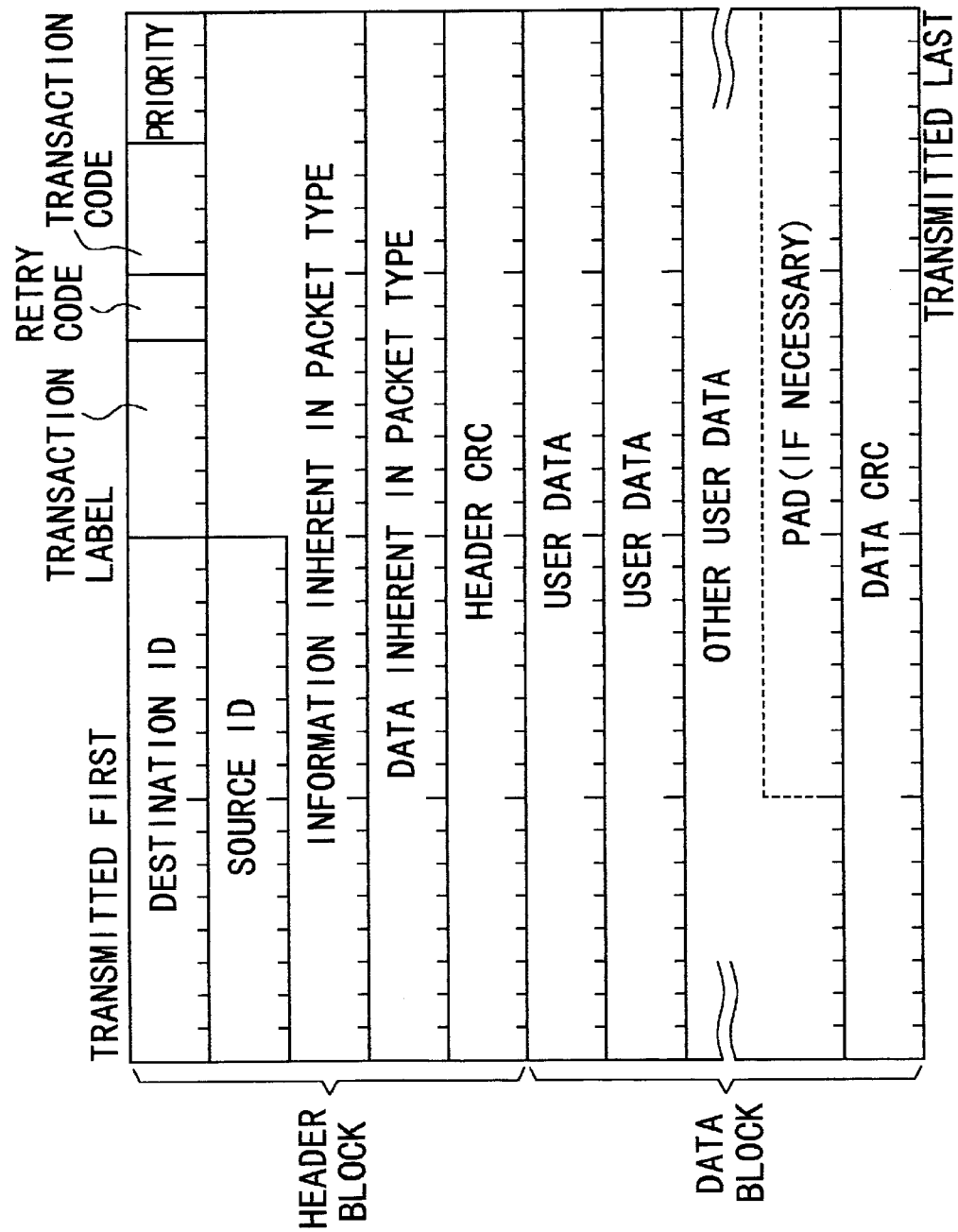
FIG. 5 is a diagram showing a data format of an IEEE 1394 standard asynchronous packet.

FIG. 5 shows a data format of an asynchronous packet. In this asynchronous packet, a header may comprise identification data of destination node (destination ID), a transaction label (tl), a retry code (rt), a transaction code (tcode), priority information (pri), identification data of source node (source ID), information inherent in packet type (destination-offset, rcode, reserved), data inherent in packet type (quadlet data, data length, extended tcode) and a header CRC.

Figure 6:
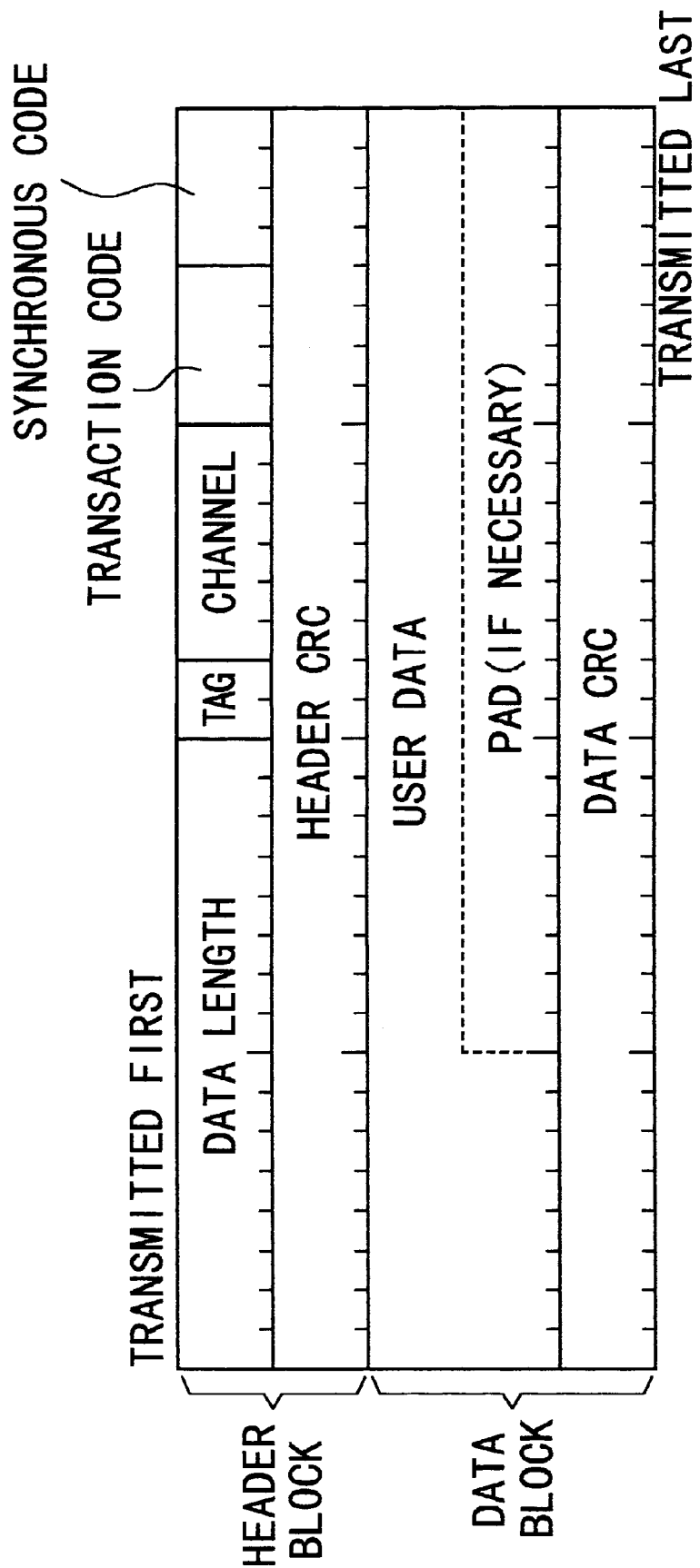
FIG. 6 is a diagram showing a data format of an IEEE 1394 standard isochronous packet.

FIG. 6 shows a data format of an isochronous packet. In this isochronous packet, a header may comprise a data length (data length), isochronous data format tag (tag), an isochronous channel (channel), a transaction code (tcode), a synchronizing code (sy) and a header CRC.

Control such as activation and stop of flow of data on the IEEE 1394 bus 101 may be implemented based on the concepts of plugs and plug control registers. As the plug control register, there may be available the above-mentioned CSR. Isochronous data which may flow from some equipment to other equipment may flow as isochronous packets in one channel on the bus 101. Isochronous data may be transmitted through an output plug of some equipment to the channel on the bus 101, and such data may be received through an input plug of other equipment.

Transmission and reception of data through the output plug and the input plug may be controlled by an output plug control register (oPCR) and an output master plug register (oMPR), and an input plug control register (iPCR) and an input master plug register (iMPR), respectively. While the master plug register may control attributes inherent in equipment, the plug control register may control attributes independent of equipment.

Figure 7:
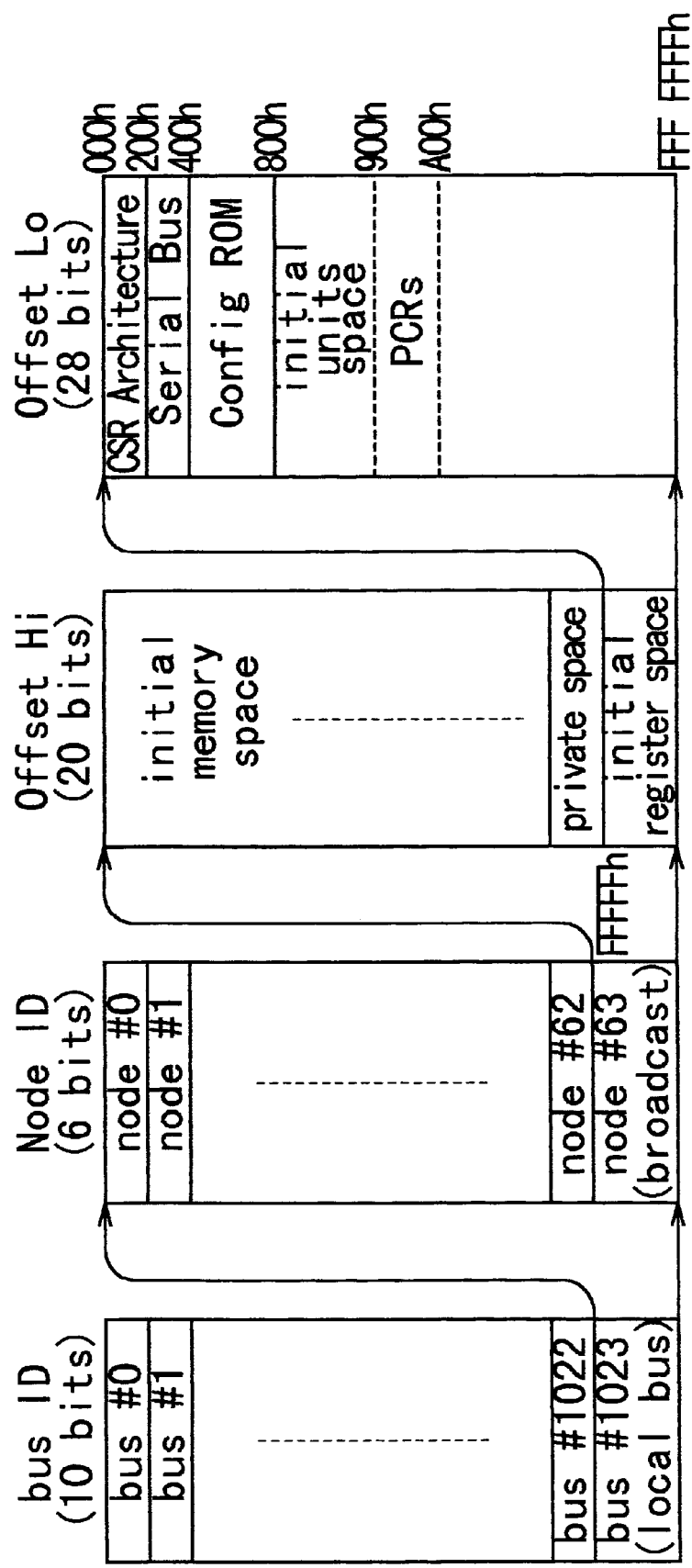
FIG. 7 is a diagram to which reference will be made in explaining a structure of a CSR architecture address space.

The IEEE 1394 may conform to a CSR (control & status register) architecture having 64-bit address space prescribed by the ISO/IEC 13213. FIG. 7 is a diagram to which reference will be made in explaining a structure of a CSR architecture address space. High-order 16 bits may be node ID which may indicate nodes on each IEEE 1394, and remaining 48 bits may be used to designate the address space given to each node. The high-order 16 bits may be divided to provide 10 bits of a bus ID and 6 bits of a physical ID (node ID in a narrow sense). Since the values in which all bits may become 1 are used for a special purpose, it may be possible to designate 1023 buses and 63 nodes.

A space prescribed by high-order 20 bits of 256 tera-byte address space prescribed by low-order 48 bits may be divided to provide an initial register space used in a 2048-byte CSR inherent register and IEEE 1394 inherent register or the like, a private space, an initial memory space and the like. If the space prescribed by high-order 20 bits is the initial register space, the space prescribed by low-order 28 bits may be used as an initial unit space used in a configuration ROM (Configuration read-only memory) and available in the use inherent in the node and a plug control register (PCRs) and the like.

FIG. 8 is a diagram to which reference will be made in explaining offset addresses, names and operations of main CSRs. The offset in FIG. 8 may indicate the offset address from FFFFF0000000h (numerals ended with h may represent a hexadecimal notation) address from which the initial register space begins. A bandwidth available register having offset 220h may indicate a bandwidth that can be assigned to the isochronous communication wherein only a value of a node which may be operating as the isochronous resource manager may be made valid. That is, although each node may have the CSR of FIG. 7, only the bandwidth available register of the isochronous resource manager may be made valid. In other words, only the isochronous resource manager may have the bandwidth available register substantially. The bandwidth available register may store therein a maximum value if the band is not assigned to the isochronous communication. Such value may be decreased each time the band is assigned to the isochronous communication.

In channel available register of offsets 224h to 228h, respective bits may correspond to channel numbers from 0 to 63, respectively. If the bit is 0, this means that such channel was already assigned. Only the channel available register of a node which may be operating as the isochronous resource manager may be made valid.

Referring back to FIG. 7, a configuration ROM based on a general ROM (general read-only memory) format may be located in the addresses 400h to 800h within the initial register space. FIG. 9 is a diagram to which reference will be made in explaining the general ROM format. A node that may be the access unit on the IEEE 1394 can have a plurality of units which are operated independently while the nodes are using the address space commonly. Unit directories (unit directories) may indicate the version and position of the software for this unit. Although positions of a bus information block (bus info block) and a root directory (root directory) are fixed, positions of other blocks may be designated by offset addresses.

FIG. 10 is a diagram showing details of the bus information block, the root directory and the unit directory. A company ID within the bus information block may store therein an ID number indicating a manufacturer of equipment. A Chip ID may store therein only one ID inherent in such equipment and which may not overlap those of other equipment. Also, according to the IEC 61883 standard, of the unit specification ID (unit spec ID) of the unit directory of equipment which satisfy the IEC 61883, 00h may be written in the first octet, A0h may be written in the second octet, and 2Dh may be written in the third octet, respectively. Further, of the unit switch version (unit sw version), 01h may be written in the first octet, and 1 may be written in the LSB (Least Significant Bit) of the third octet.

In order to control the input and output of equipment through an interface, the node may include a PCR, prescribed by the IEC 61883, in the addresses 900h to 9FFh within the initial unit space of FIG. 7. This may be an entity of a concept of plug in order to form a signal line analogous to an analog interface from a logical standpoint as mentioned above. FIG. 11 is a diagram to which reference will be made in explaining an arrangement of a PCR. The PCR may include an oPCR (output plug control register) indicative of an output plug and an iPCR (input plug control register) indicative of an input plug. Also, the PCR may include oMPR (output master plug register) and iMPR (input master plug register) registers indicative of output plug or input plug information inherent in each equipment. Although each equipment should not include a plurality of oMPRs and iMPRs, equipment can include a plurality of oPCRs and iPCRs corresponding to individual plugs in accordance with a capability thereof. The PCR shown in FIG. 11 may include 31 oPCRs and 31 iPCRs, respectively. A flow of isochronous data may be controlled by operating the registers corresponding to these plugs.

FIGS. 12A to 12D are diagrams showing arrangements of the oMPR, the oPCR, the iMPR and the iPCR, respectively. Specifically, FIG. 12A shows the arrangement of the oMPR, FIG. 12B shows the arrangement of the oPCR, FIG. 12C shows the arrangement of the iMPR, and FIG. 12D shows the arrangement of the iPCR, respectively. A 2-bit data rate capability on the MSB (most significant bit) side of the oMPR and the iMPR may store therein a code indicative of the maximum transmission rate of isochronous data that can be transmitted from and received by that equipment. A broadcast channel base of the oMPR may prescribe the channel number used in the broadcast output. If transmission equipment does not set a channel when the transmission is started, then a channel described in this 6-bit "broadcast channel base" field may be used as a transmission channel (default channel).

A 5-bit number of output plugs on the LSB side of the oMPR may store therein the number of output plugs of that equipment, i.e. a value indicative of the number of oPCRs.

A 5-bit number of input plugs on the LSB side of the iMPR may store therein the number of input plugs of that equipment, i.e. a value indicative of the number of iPCRs. A non-persistent extension field and a persistent extension field may be areas defined for future expansion.

A 6-bit area following the 2-bit data rate capability of the iMPR may be a reserved field, and may be used to set a reception channel (default channel) in this embodiment. If the reception equipment does not set a channel when the transmission is started, then a channel described in this 6-bit reserved area may be used as the reception channel.

An on-line on the MSB of the oPCR and the iPCR may indicate the state in which the plug is in use. That is, if the value of such on-line is held at 1, then this means that its plug may be ON-LINE. If it is held at 0, then this means that its plug may be OFF-LINE. A value of a broadcast connection counter of the oPCR and the iPCR may indicate the existence of the broadcast connection (1) or the absence of the broadcast connection (0). A value of a point-to-point connection counter having a 6-bit width of the oPCR and the iPCR may indicate the number of point-to-point connections of that plug.

A value of a channel number having a 6-bit width of the oPCR and the iPCR may indicate the isochronous channel number to which that plug may be connected. A value of a data rate having a 2-bit width of the oPCR may indicate a real transmission rate of a packet of isochronous data outputted from that plug. A code stored in an overhead ID having a 4-bit width of the OPCR may indicate the bandwidth of the overhead of the isochronous communication. A value of a payload having a 10-bit width of the oPCR may indicate the maximum value of data contained in the isochronous packet that can be handled by that plug.

Figure 13:
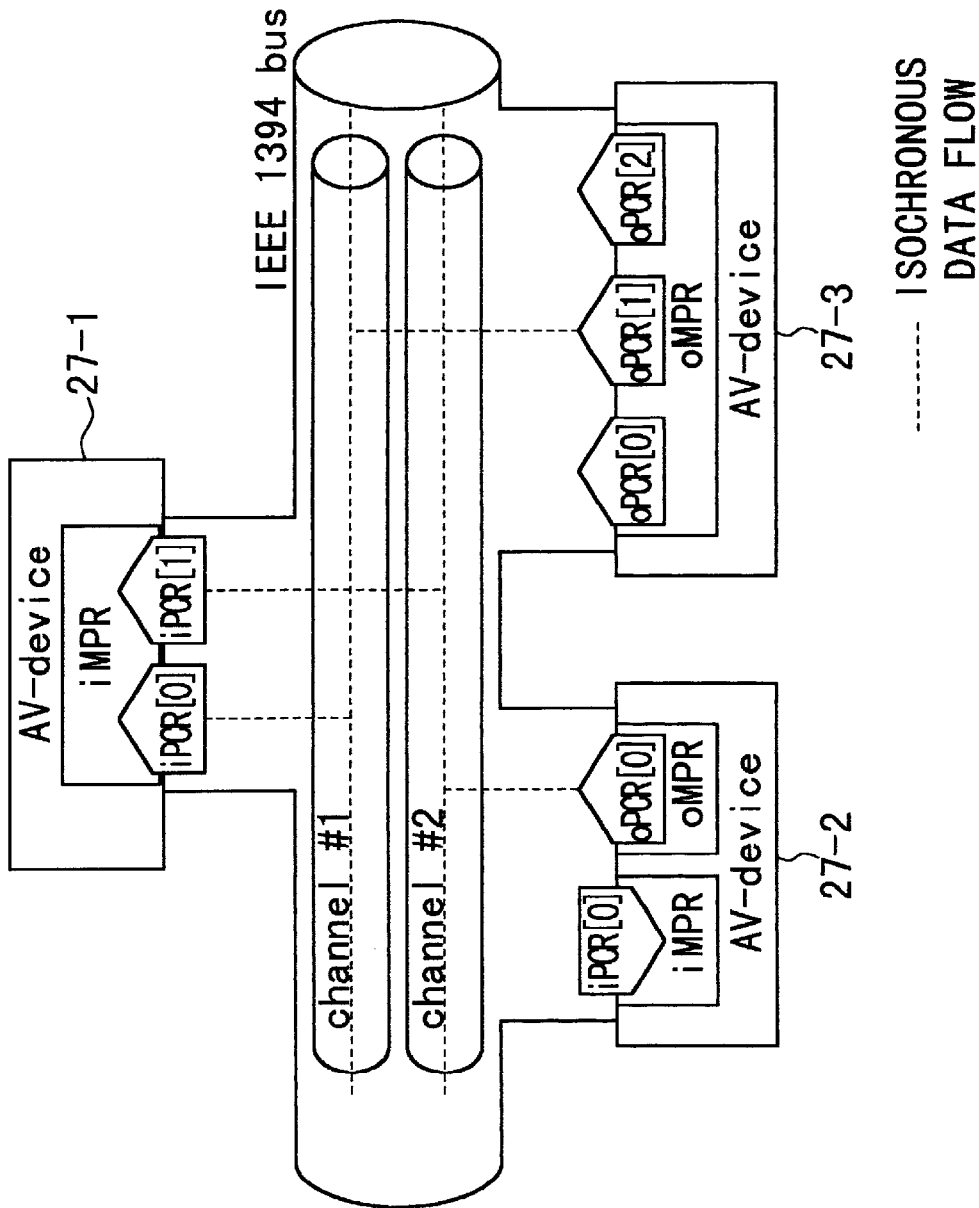
FIG. 13 is a diagram showing a relationship among a plug, a plug control register and an isochronous channel.

FIG. 13 is a diagram showing a relationship among the plug, the plug control register and the isochronous channel. AV devices 27-1 to 27-3 may be connected by the IEEE 1394 bus. Isochronous data whose channel was designated by an oPCR[1] of oPCR[0] to oPCR[2] and whose transmission rate and whose number of oPCR may be prescribed by the oMPR of the AV device 27-3 may be transmitted to a channel #1 of the IEEE 1394 bus. Based on iPCR[0] whose input channel #1 was designated of iPCR[0] and iPCR[1] whose transmission rate and whose number of iPCR were prescribed by the iMPR of the AV device 27-1, the AV device 27-1 may read the isochronous data from the channel #1 of the IEEE 1394 bus. Similarly, the AV device 27-2 may transmit isochronous data to a channel #2 designated by the oPCR[0], and the AV device 27-1 may read the isochronous data from a channel #2 designated by the iPCR[1].

In this embodiment, the description of "broadcast channel base" field of the output master plug register (oMPR) shown in FIG. 12A and the description of the 6-bit reserved field of the input master plug register (iMPR) shown in FIG. 12C can be rewritten by a user when the user may operate the operation section 116.

Figures 14, 15:
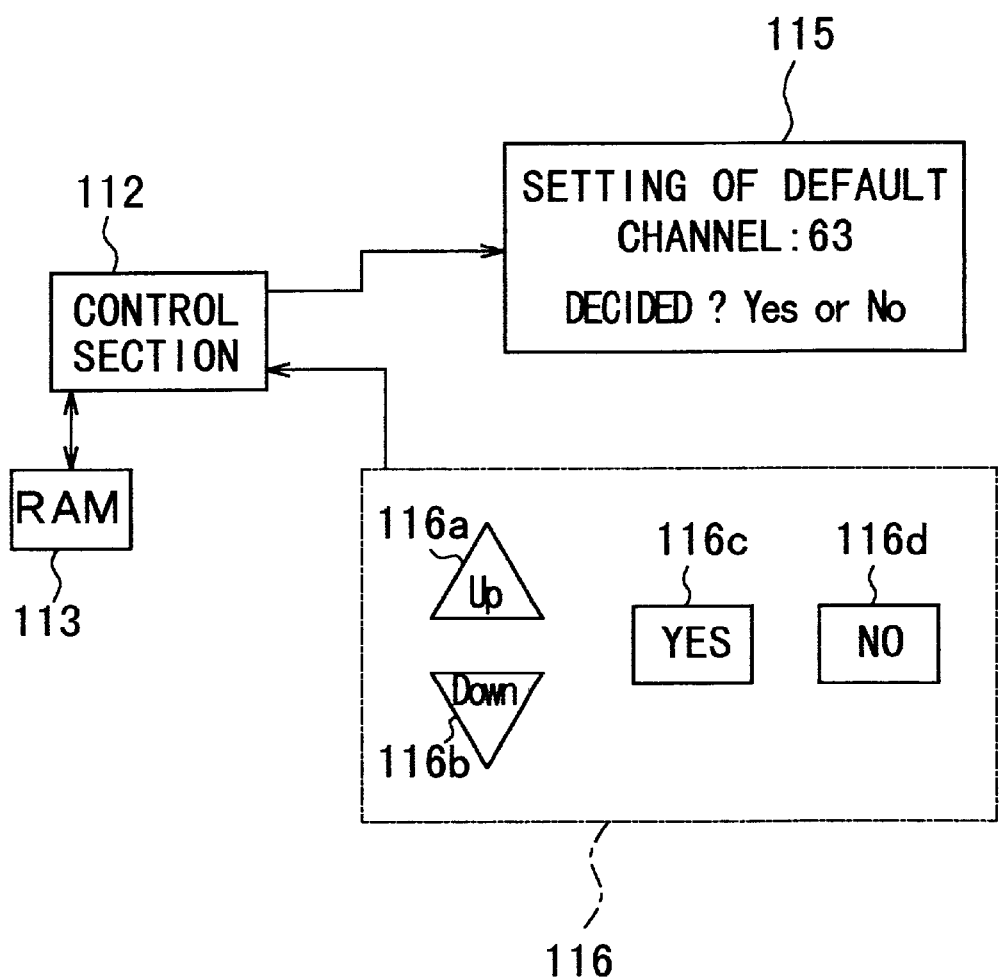
FIG. 14 is a diagram to which reference will be made in explaining the manner in which transmission and reception channels are set by operating an operation section.
FIG. 15 is a diagram showing a format of a communication command.

That is, when electronic equipment is set to a channel setting mode by a user operating a mode change key (not shown) of the operation section 116, the control section 112 may display a channel setting picture on the display section 115 as shown in FIG. 14. In this state, the user is able to select the set channels by depressing an up-key 116*a* and a down-key 116*b* of the operation section 116. Thereafter, when the user depresses a "YES" key 116*c*, the control section 112 may write the channel thus selected in the "broadcast channel base" field of the output master plug register (oMPR) and the 6-bit reserved field of the input master plug register (iMPR) within the RAM 113, and then may end the channel setting mode. When the user depresses a "NO" key 116*d* instead of the "YES" key 116*c*, the control section need not write the selected channel, and may end the channel setting mode.

Also, while the same channel may be written in the "broadcast channel base" field of the output master plug register (oMPR) and the 6-bit reserved field of the input master plug register (iMPR) and the same channel may be set as the transmission and reception default channels in the above-mentioned setting operation, when electronic equipment may be set to the channel setting mode of any of the transmission channel and the reception channel by operating the mode change key, by the similar setting operation mentioned above, the selected channel may be written in the "broadcast channel base" field of the output master plug register (oMPR) and the 6-bit reserved field of the input master plug register (iMPR), and the transmission or reception default channel may be set.

Incidentally, while the setting picture may be displayed on the display section 115 of each equipment in the above-mentioned setting operation, this setting picture may be displayed on the monitors 104, 105 connected to the bus 101 and may be used by a user's setting operation.

As described above, according to this embodiment, each equipment serving as the IEEE 1394 node connected to the IEEE 1394 bus 101 may include the register for setting the default channels of the transmission channel and the reception channel and in which the transmission channel and the reception channel may be arbitrarily and easily set to this register by a user operating the operation section 116.

Thus, the user can easily prepare several channels using the same default channel in accordance with the performances of each equipment. The performances of each equipment may be corresponding formats of DVCR, MPEG, audio or the like and a speed at which data can be transmitted and the like. Also, there may be made groups for different purposes even though equipment have the same performance. Of the groups thus made, when data may be sequentially transmitted from a plurality of equipment, a plurality of equipment take the same channel in that sequential order. Accordingly, equipment which may receive this default channel is able to constantly receive data from the new equipment which begins to transmit data. In this case, when it is intended to prevent the new transmission equipment from taking a channel until the recording of a signal is ended after some reception equipment started recording the signal, it may be possible to lock such channel.

Also, while the transmission channel and the reception channel may be set by describing the channel in the "broadcast channel base" field of the above-mentioned output master plug register (oMPR) and the 6-bit reserved field of the input master plug register (iMPR) in the above-mentioned embodiment, the transmission channel and the reception channel can be set by transmitting communication command from other equipment.

Figure 16:
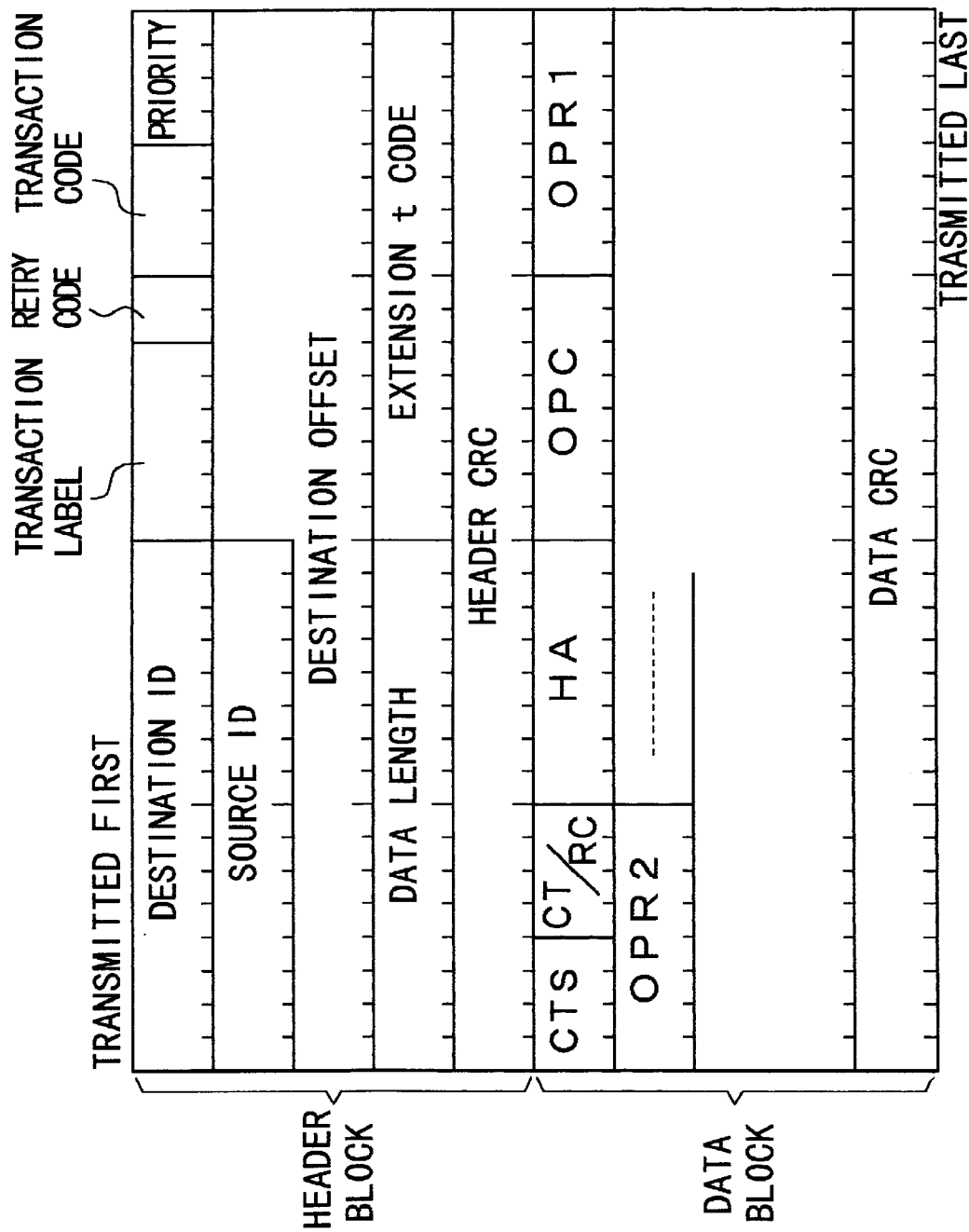
FIG. 16 is a diagram showing an asynchronous packet in which a communication command is inserted into a data block.

FIG. 15 shows a command format. A CTS (command transaction set) may indicate the type of the command set. A CT/RC (command type/response code) may indicate the type of requirement with respect to the command, and may indicate the type of response with respect to the response. An HA (header address) may indicate the address with respect to the command, and may indicate the source with respect to the response. Then, an OPC (operation code) and an OPR (operand) may indicate the command and its parameter. Such communication command may be inserted into the data block portion of the asynchronous packet and then transferred as shown in FIG. 16.

The manner in which a channel is set to equipment B from equipment A will be described. FIG. 17A shows an example of a set command transmitted from the equipment A to the equipment B. This set command may comprise an OPC, an OPR1, an OPR2 following the CTS, the CT/RC, HA. The CTS may be set to "0h" (here, "h" may represent the hexadecimal notation). This "0h" may mean that the set command may be an AV/C (audio.video/control) command set which may conform to the IEEE 1394 bus protocol. The CT/RC may be set to "CONTROL". The HA may be set to "equipment B". The OPC may be set to "default channel set". The OPR1 may be set to "input" or "output". In this case, when the reception default channel is set, it may be set to "input". When the transmission default channel is set, it may be set to "output". The OPR2 may be set to "channel number" and may indicate the channel number to be set.

In the equipment B which received such set command, the control section 112 may write the channel indicated by the OPR2 in the "broadcast channel base" field of the output master plug register (oMPR) or the 6-bit reserved field of the input master plug register (iMPR) within the RAM 113. Thereafter, this equipment B may transmit a response shown in FIG. 17B to the equipment A. This response may comprise an OPC, an OPR1, an OPR2 following the CTS, the CT/RC, HA. The CTS, the HA, the OPC, the OPR1, the OPR2 may have the same contents as those of the above-mentioned set command. Only the HA may be set to "equipment A". In the equipment A which received this response, the control section 112 can confirm that the transmission or reception default channel may be set in the equipment B as instructed.

While the transmission or reception default channel may be set by transmitting the communication command from other equipment as described above, the transmission or reception default channel can be set by directly writing a channel in the "broadcast channel base" field of the output master register (oMPR) or the 6-bit reserved field of the input master plug register (iMPR) from other equipment. In this case, there may be used a transaction comprising a compare and swap command and a response prescribed in the IEEE 1394 specification, for example.

Since the transmission or reception default channel of each equipment can be set by using a communication command from other equipment or the like as described above, equipment which can transmit a communication command or the like can set default channels of other equipment in a centralized fashion.

While the setting of the reception default channel also is made possible by using the 6-bit reserved field of the input master plug register (iMPR) as described above, this reception default channel may not be set independently but the transmission default channel set in the "broadcast channel base" field of the output master plug register (oMPR) may be used as the reception default channel.

Although not shown, any equipment (e.g. personal computer) connected to the IEEE 1394 bus may select an auto configuration of an application software, for example, may read Unique ID by reading configuration ROMs of all equipment connected to the bus, may read icon information of model, may discriminate a corresponding speed by analyzing collected Self ID and may check a corresponding format by using an AV/C command, whereby all target equipment may be grouped to provide recommended groups which may be displayed on the screen of the monitor. Then, further, after the user made the confirmation operation, the above-mentioned set command, for example, may be issued in response to the resultant groups, whereby default channels of all equipment may be set automatically.

Figure 18:
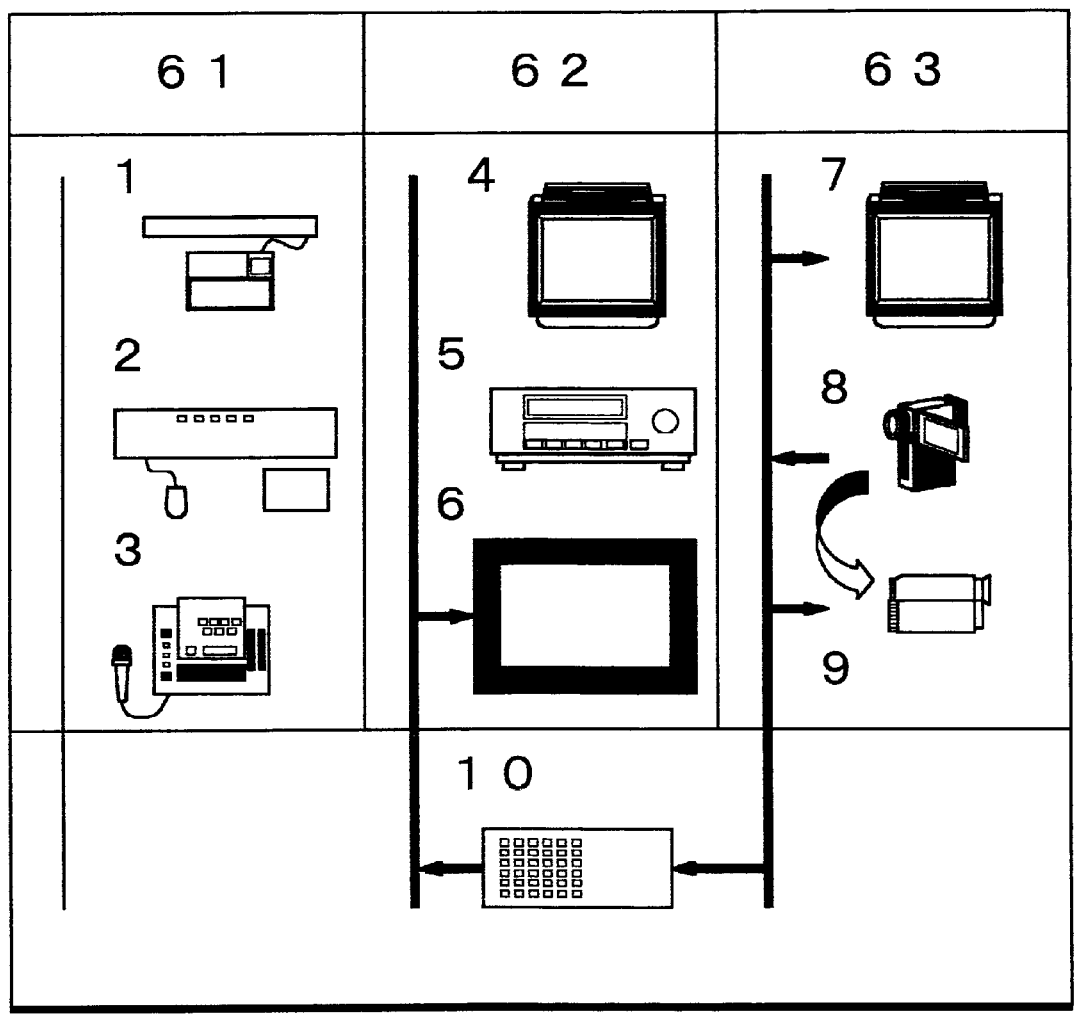
FIG. 18 is a diagram showing an example of the manner in which equipment may be grouped to provide equipment groups.

FIG. 18 shows an example of the manner in which groups may be displayed. This display example may be an example in which equipment 1 to 10 may be grouped to provide three groups of channel 61, channel 62, channel 63. The equipment 1 to 3 of the channel 61 may be audio-relating equipment, the equipment 4 to 6 of the channel 62 may be video equipment which may handle the MPEG format, and the equipment 7 to 9 of the channel 63 may be video equipment which may handle the DVCR format. Also, the equipment 10 may be equipment which may be used to convert the format between the DVCR and the MPEG. The reception (input) may be set to the channel 63, and the transmission (output) may be set to the channel 62.

In the channel 61, any of the equipment 1 to 3 may not receive data. In the channel 62, the equipment 10 may transmit data, and the equipment 6 may receive data. In the channel 63, the equipment 8 may transmit data, and the equipment 7, 9, 10 may receive data. In this case, the equipment 9 may be locked in order to record a signal from the equipment 8 or the like. Also, the equipment 10 may convert data of the DVCR format of the channel 63 into data of the MPEG format and transmit the resultant data to the channel 62.

While this invention is applied to the electronic equipment used in the communication system connected via the IEEE 1394 bus as described above, it is needless to say that this invention can be similarly applied to electronic equipment used in a communication system connected via other communication bus.

According to this invention, the electronic equipment may include the register for setting the transmission or reception default channel and the operation means for setting a channel to the register. Therefore, a user can set the transmission or reception channel arbitrarily and easily. Thus, equipment having different performances can be grouped into other groups, and a plurality of channels can be communicated simultaneously. Also, since equipment is grouped into different groups in response to different transmission rates, the band can be used effectively. That is, if the equipment is not grouped into different groups in the above-mentioned manner, then in order for electronic equipment to match with performances of all sorts of reception equipment, it is unavoidable that data should be transmitted at the lowest transmission rate.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An electronic equipment connected to a communication bus for receiving data of a predetermined channel transmitted through said communication bus, said electronic equipment comprising:

memory means for storing a reception channel;

operation means for setting the reception channel in said memory means, where said reception channel is set at any desired time and is any desired reception channel; and reception means for receiving data of said reception channel transmitted through said communication bus based on said reception channel set to said memory means.

2. The electronic equipment as claimed in claim 1, wherein said memory means comprises a register.

3. The electronic equipment according to claim 1, further comprising display means for displaying a setting picture for setting said reception channel in said memory means by said operation means.

4. An electronic equipment connected to a communication bus for receiving data of a predetermined channel transmitted through said communication bus, said electronic equipment comprising:
 memory means for storing a reception channel;
 reception means for receiving a communication command transmitted through said communication bus;
 determination means for determining whether said communication command received at said reception means is a communication command concerning setting a reception channel;
 setting means for setting said reception channel in said memory means when said communication command received at said reception means is the communication command concerning setting a reception channel, where said reception channel is set at any desired time and is any desired reception channel; and
 reception means for receiving data of said reception channel transmitted through said communication bus based on said reception channel set to said memory means.

5. The electronic equipment as claimed in claim 4, wherein said communication command comprises a packet of a predetermined format and said packet includes:
 a command discrimination element for indicating that said communication command is a communication command concerning the setting of a transmission channel,
 a transmission and reception discrimination element for determining whether a set channel is a reception channel or a transmission channel, and a channel number discrimination element for indicating a set channel number.

6. An electronic equipment connected to a communication bus for transmitting data of a predetermined channel to said communication bus, said electronic equipment comprising:
 memory means for storing a transmission channel;
 operation means for setting a transmission channel in said memory means, where said transmission channel is set at any desired time and is any desired transmission channel; and
 transmission means for transmitting data from said transmission channel through said communication bus based on said memory means to which said transmission channel was set.

7. The electronic equipment as claimed in claim 6, wherein said memory means comprises a register.

8. The electronic equipment according to claim 6, further comprising display means for displaying a setting picture for use in setting said transmission channel to said memory means by said operation means.

9. An electronic equipment connected to a communication bus for transmitting data of a predetermined channel to said communication bus, said electronic equipment comprising:
 memory means for storing a transmission channel;
 reception means for receiving a communication command transmitted through said communication bus;
 determination means for determining whether said communication command received at said reception means is a communication command concerning setting a transmission channel;
 setting means for setting said transmission channel in said memory means when said communication command is a communication command the setting the transmission channel, where said transmission channel is set at any desired time and is any desired transmission channel; and
 transmission means for transmitting data form said transmission channel through said communication bus based on said transmission channel set to said memory means.

10. An electronic equipment connected to other electronic equipment through a communication bus, said electronic equipment comprising:
 issue means for issuing a communication command used to set at least one of a reception channel and a transmission channel of other electronic equipment connected to said communication bus, where the reception channel is set at any desired time and is any desired reception channel and where the transmission channel is set at any desired time and is any desired transmission channel; and
 transmission means for transmitting said communication command issued by said issue means through said communication bus to said other electronic equipment.

11. The electronic equipment as claimed in claim 10, wherein said issue means includes generation means for generating a packet of a predetermined format and said packet thus generated includes;
 a command discrimination element for indicating that said communication command is a communication command concerning the setting of a channel,
 a transmission and reception discrimination element for determining whether a set channel is a reception channel or a transmission channel, and
 a channel number discrimination element for indicating a set channel number.

12. A data reception method used with a communication bus for receiving data of a predetermined channel transmitted through said communication bus, comprising the steps of:
 setting a reception channel, where the reception channel is set at any desired time and is any desired reception channel;
 storing said reception channel in a memory; and
 receiving data of said reception channel transmitted through said communication bus based on said reception channel memorized said memory means.

13. The data reception method as claimed in claim 12, wherein step of setting operation process includes displaying a set picture for use in setting said reception channel and memorizing in said memory.

14. A data reception method used with a communication bus for receiving data of a predetermined channel transmitted through said communication bus, comprising:
 a reception process for receiving a communication command transmitted through said communication bus
 a determination process for determining whether said communication command received at said reception process is a communication command received at said reception process is a communication command concerning setting a reception channel;
 a setting process for setting a reception channel in memory when said communication command is the communication command concerning setting the reception channel, where the reception channel is set at any desired time and is any desired reception channel; and a reception process for receiving data of said reception channel transmitted through said communication bus based on said reception channel set to said memory.

15. A data transmission method used with a communication bus for transmitting data of a predetermined channel to said communication bus, comprising:

a transmission channel setting operation for performing an operation to set a transmission channel, where the transmission channel is set at any desired time and is any desired transmission channel;

a transmission channel setting process for storing said transmission channel in a memory based on said transmission channel setting operation; and a transmission process for transmitting data through said communication bus from said transmission channel based on said transmission channel memorized in said memory.

16. The data transmission method as claimed in claim 15, wherein said transmission channel setting operation includes a display step for displaying a set picture used for setting said transmission channel to said memory.

17. A data transmission method connected to a communication bus for transmitting data of a predetermined channel to said communication bus, comprising:

a reception process for receiving a communication command transmitted through said communication bus;

a determination process for determining whether said communication command received at said reception process is a communication command concerning setting a transmission channel;

a setting process for setting a transmission channel in said memory means when said communication command is the communication command concerning setting the transmission channel, where the transmission channel is set at any desired time and is any desired transmission channel; and a transmission process for transmitting data from said transmission channel through said communication bus based on said transmission channel set to said memory means.

18. A channel setting method for setting a channel of electronic equipment connected to other electronic equipment through a communication bus, comprising:

an issue process for issuing a communication command used to set at least one of a reception channel and a transmission channel of other electronic equipment connected to said communication bus, where the reception channel is set at any desired time and is any desired reception channel and where the transmission channel is set at any desired time and is any desired transmission channel; and a transmission process for transmitting said communication command issued at said issue process to said other electronic equipment through said communication bus.

* * * * *